United States Patent
Katou

(10) Patent No.: US 8,412,636 B2
(45) Date of Patent: Apr. 2, 2013

(54) BELT TYPE CONTINUOUSLY VARIABLE TRANSMISSION AND CONTROL METHOD THEREOF

(75) Inventor: Yoshiaki Katou, Fujisawa (JP)

(73) Assignee: JATCO Ltd, Fuji-shi (JP)

( * ) Notice: Subject to any disclaimer, the term of this patent is extended or adjusted under 35 U.S.C. 154(b) by 606 days.

(21) Appl. No.: 12/720,473

(22) Filed: Mar. 9, 2010

(65) Prior Publication Data

US 2010/0248874 A1    Sep. 30, 2010

(30) Foreign Application Priority Data

Mar. 24, 2009    (JP) .................................. 2009-71402

(51) Int. Cl.
*G06F 7/00*    (2006.01)

(52) U.S. Cl. ................ 705/51; 474/28; 474/18; 477/37; 477/44

(58) Field of Classification Search ..................... 701/51, 701/56; 474/28, 18; 477/37, 44
See application file for complete search history.

(56) References Cited

U.S. PATENT DOCUMENTS

| 6,050,912 | A | 4/2000 | Kobayashi |
| 2003/0050149 | A1 | 3/2003 | Iida et al. |
| 2006/0069486 | A1* | 3/2006 | Yamaguchi et al. ............ 701/51 |
| 2007/0117663 | A1 | 5/2007 | Van Der Leest et al. |
| 2007/0232423 | A1* | 10/2007 | Katou et al. .................... 474/28 |

FOREIGN PATENT DOCUMENTS

| EP | 0 850 372 A1 | 7/1998 |
| JP | 61-132428 A | 6/1986 |
| JP | 10-030698 A | 2/1998 |
| JP | 2004-084749 A | 3/2004 |
| JP | 2004-316799 A | 11/2004 |

* cited by examiner

*Primary Examiner* — Behrang Badii

(74) *Attorney, Agent, or Firm* — Foley & Lardner LLP

(57) ABSTRACT

A belt type continuously variable transmission includes a continuously variable shift mechanism having a primary pulley, a secondary pulley and a belt wound around the respective pulleys, a pulley thrust calculation unit that calculates a pulley thrust, which is used to bias the respective pulleys in a direction for reducing the pulley width, so as to include a predetermined margin, a hydraulic control unit that controls an oil pressure supplied to each of the pulleys on the basis of the calculated pulley thrust, and an upshift determination unit that determines whether or not an upshift, during which the speed ratio is reduced, is underway. The pulley thrust calculation unit sets the predetermined margin to be smaller when an upshift is determined to be underway than when an upshift is determined not to be underway.

12 Claims, 7 Drawing Sheets

BELT TYPE CONTINUOUSLY VARIABLE TRANSMISSION AND CONTROL METHOD THEREOF

FIELD OF THE INVENTION

This invention relates to control of a clamping force of a pulley in a belt type continuously variable transmission.

BACKGROUND OF THE INVENTION

In a conventional belt type continuously variable transmission, a belt is wound around a primary pulley and a secondary pulley, and a shift operation is performed by varying respective pulley widths of the primary pulley and secondary pulley. The pulley width of each pulley varies according to a clamping force of each pulley, and a required clamping force is calculated on the basis of an input torque, a belt winding radius, and so on. In a conventional technique for preventing belt slippage, a predetermined safety factor having a fixed value is multiplied by the clamping force to set the clamping force at a value having a margin relative to the input torque. JP10-30698A discloses a technique for preventing Low side belt slippage by setting the safety factor at a steadily larger value as a shift value moves toward a Low side, rather than at a fixed value.

SUMMARY OF THE INVENTION

However, in the conventional technique described above, the clamping force of the pulley is calculated by being multiplied by a predetermined safety factor, and therefore an oil pressure supplied to each pulley must be set at a correspondingly higher value, leading to an increase in a required line pressure. As a result, a load of a hydraulic pump increases, leading to a reduction in fuel efficiency. Furthermore, when the safety factor is set excessively low, the clamping force of the pulley is insufficient, and therefore belt slippage may occur.

An object of this invention is to reduce a clamping force of a pulley within a range in which belt slippage does not occur.

According to an aspect of the present in invention, a belt type continuously variable transmission comprises a continuously variable shift mechanism having a primary pulley and a secondary pulley, respective pulley widths of which can be modified, and a belt wound around the respective pulleys, which varies a shift ratio by varying the pulley width in order to vary a contact radius between the respective pulleys and the belt, a pulley thrust calculation unit that calculates a pulley thrust, which is used to bias the respective pulleys in a direction for reducing the pulley width, so as to include a predetermined margin, a hydraulic control unit that controls an oil pressure supplied to each of the pulleys on the basis of the calculated pulley thrust, and an upshift determination unit that determines whether or not an upshift, during which the speed ratio is reduced, is underway. The pulley thrust calculation unit sets the predetermined margin to be smaller when an upshift is determined to be underway than when an upshift is determined not to be underway.

According to another aspect of the present invention, a control method for a belt type continuously variable transmission which includes a continuously variable shift mechanism having a primary pulley and a secondary pulley, respective pulley widths of which can be modified, and a belt wound around the respective pulleys, which varies a shift ratio by varying the pulley width in order to vary a contact radius between the respective pulleys and the belt is provided. The method comprises calculating a pulley thrust which is used to bias the respective pulleys in a direction for reducing the pulley width so as to include a predetermined margin is provided. The method includes controlling an oil pressure supplied to each of the pulleys on the basis of the calculated pulley thrust, and determining whether or not an upshift, during which the speed ratio is reduced, is underway. The predetermined margin is set to be smaller when an upshift is determined to be underway than when an upshift is determined not to be underway. The details as well as other features and advantages of these aspects are set forth in the remainder of the specification and are shown in the accompanying drawings.

DESCRIPTION OF THE PREFERRED EMBODIMENTS

Figure 1:
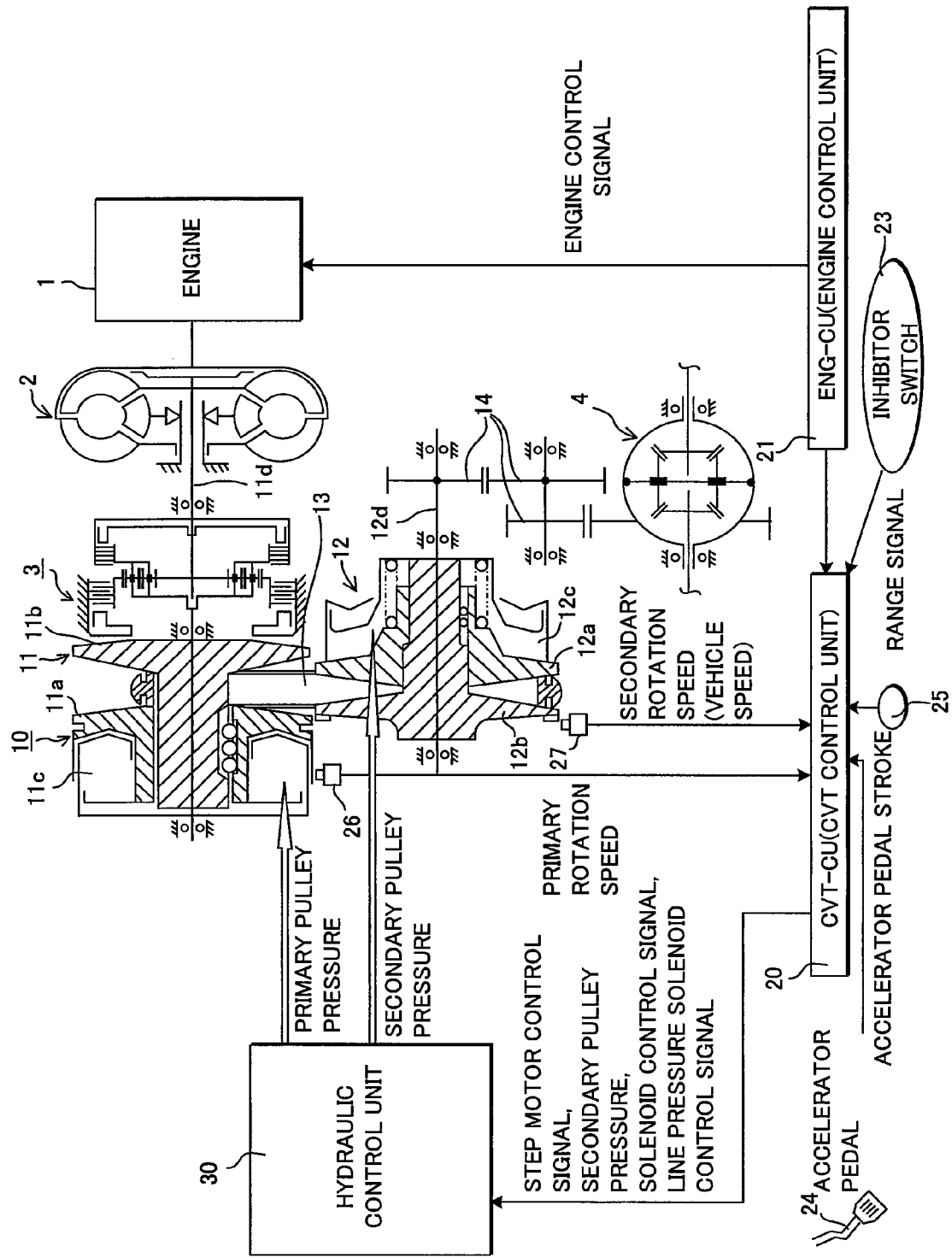
FIG. 1 is a schematic constitutional diagram showing a belt type continuously variable transmission according to an embodiment.

FIG. 1 is a schematic constitutional diagram showing a line pressure control device of a belt type continuously variable transmission according to this embodiment. A belt type continuously variable transmission 10 comprises a primary pulley 11, a secondary pulley 12, a V belt 13, a CVT control unit 20 (to be referred to as a "CVTCU" hereafter), and a hydraulic control unit 30.

The primary pulley 11 is an input shaft side pulley that inputs a rotation of an engine 1 into the belt type continuously variable transmission 10. The primary pulley 11 includes a fixed conical plate 11b that rotates integrally with an input shaft 11d, and a movable conical plate 11a that is disposed opposite the fixed conical plate 11b so as to form a V-shaped pulley groove and can be displaced in an axial direction by an oil pressure acting on a primary pulley cylinder chamber 11c. The primary pulley 11 is connected to the engine 1 via a forward-reverse change-over mechanism 3 and a torque converter 2 having a lockup clutch, and inputs the rotation of the engine 1. A rotation speed of the primary pulley 11 is detected by a primary pulley rotation speed sensor 26.

The V belt 13 is wound around the primary pulley 11 and the secondary pulley 12, and transmits a rotation of the primary pulley 11 to the secondary pulley 12.

The secondary pulley 12 outputs the rotation transmitted thereto by the V belt 13 to a differential 4. The secondary pulley 12 includes a fixed conical plate 12b that rotates integrally with an output shaft 12d, and a movable conical plate 12a that is disposed opposite the fixed conical plate 12b so as to form a V-shaped pulley groove and can be displaced in the axial direction in accordance with an oil pressure acting on a secondary pulley cylinder chamber 12c. A pressure receiving surface area of the secondary pulley cylinder chamber 12c is set to be substantially equal to the pressure receiving surface area of the primary pulley cylinder chamber 11c.

The secondary pulley 12 is connected to the differential 4 via an idler gear 14 and an idler shaft, and outputs the transmitted rotation to the differential 4. A rotation speed of the secondary pulley 12 is detected by a secondary pulley rotation speed sensor 27. A vehicle speed can be calculated from the rotation speed of the secondary pulley 12.

The CVTCU 20 determines a shift ratio and a contact frictional force on the basis of signals from an inhibitor switch 23, an accelerator pedal stroke sensor 24, an oil temperature sensor 25, the primary pulley rotation speed sensor 26, the secondary pulley rotation speed sensor 27, and so on and input torque information from an engine control unit 21, and transmits a command to the hydraulic control unit 30 to control the belt type continuously variable transmission 10.

The hydraulic control unit 30 operates in response to a command from the CVTCU 20. The hydraulic control unit 30 moves the movable conical plate 11a and the movable conical plate 12a in a rotary axis direction by controlling the oil pressure supplied to the primary pulley 11 and secondary pulley 12.

When the movable conical plate 11a and the movable conical plate 12a move, a pulley groove width varies. Accordingly, the V belt 13 moves over the primary pulley 11 and secondary pulley 12. As a result, a contact radius between the V belt 13 and the primary pulley 11 and secondary pulley 12 changes, whereby the shift ratio and the contact frictional force of the V belt 13 are controlled.

The rotation of the engine 1 is input into the belt type continuously variable transmission 10 via the torque converter 2 and the forward-reverse change-over mechanism 3 and then transmitted from the primary pulley 11 to the differential 4 via the V belt 13 and the secondary pulley 12.

When an accelerator pedal is depressed or a shift change is performed in a manual mode, the movable conical plate 11a of the primary pulley 11 and the movable conical plate 12a of the secondary pulley 12 are displaced in the axial direction such that the contact radius thereof with the V belt 13 is modified, and as a result, the shift ratio is varied continuously.

Figure 2:
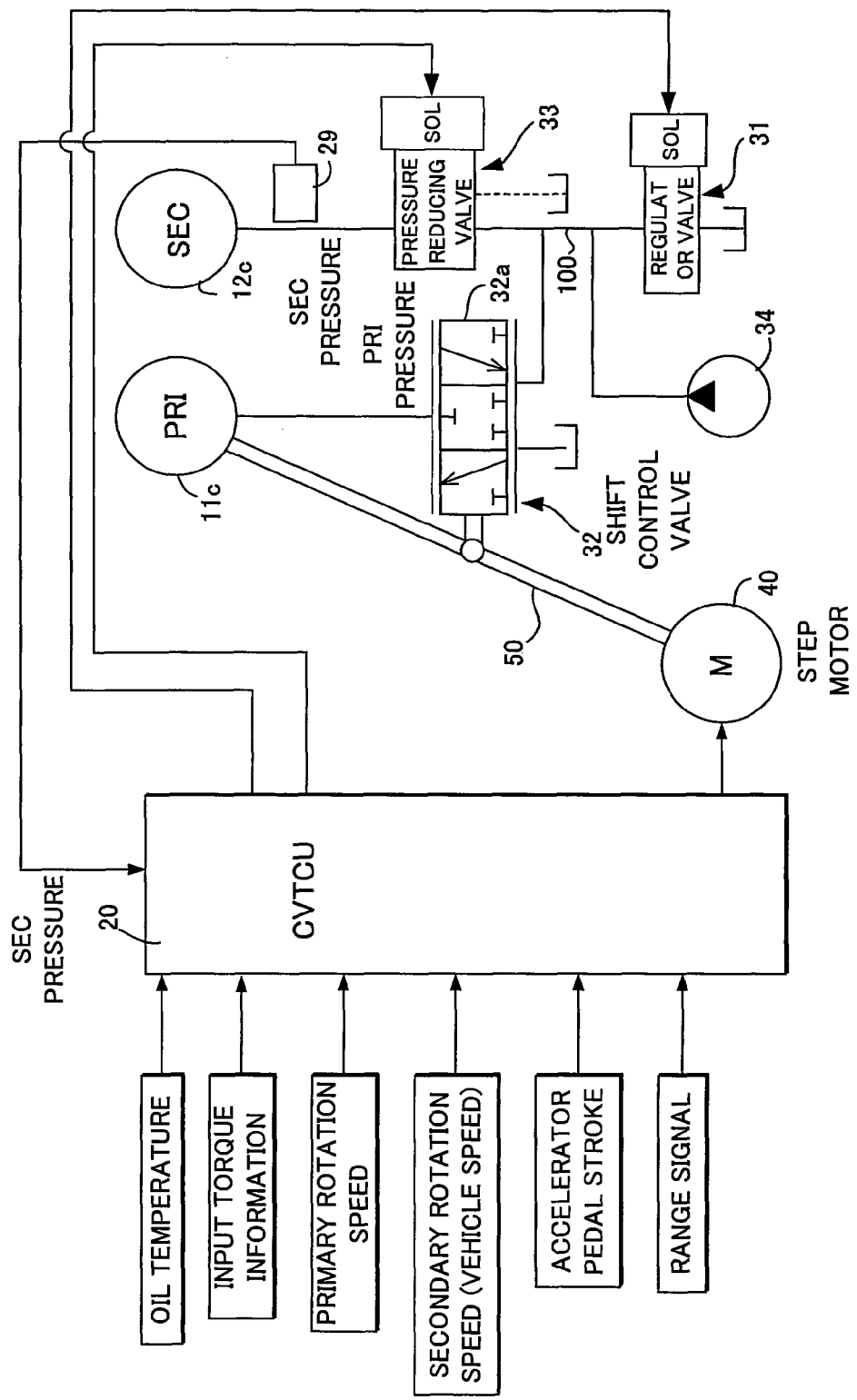
FIG. 2 is a schematic diagram showing a hydraulic control unit and a CVTCU.

FIG. 2 is a schematic diagram showing the hydraulic control unit and the CVTCU.

The hydraulic control unit 30 includes a regulator valve 31, a shift control valve 32, and a pressure reducing valve 33, and controls an oil pressure supplied from a hydraulic pump 34 before supplying the oil pressure to the primary pulley 11 and secondary pulley 12.

The regulator valve 31 is a pressure regulating valve that includes a solenoid and regulates the pressure of the oil pumped from the hydraulic pump 34 to a predetermined line pressure in accordance with a command (a duty signal or the like, for example) from the CVTCU 20.

The line pressure supplied by the hydraulic pump 34 and regulated by the regulator valve 31 is supplied to the shift control valve 32 and the pressure reducing valve 33, respectively.

The shift control valve 32 is a control valve that controls an oil pressure of the primary pulley cylinder chamber 11c (to be referred to as a "primary pressure" hereafter) to a desired target pressure. The shift control valve 32 is connected to a servo link 50 constituting a mechanical feedback mechanism such that the shift control valve 32 is driven by a step motor 40 connected to one end of the servo link 50 and receives feedback relating to the groove width, or in other words an actual shift ratio, from the movable conical plate 11a of the primary pulley 11, which is connected to the other end of the servo link 50. The shift control valve 32 performs oil pressure intake and discharge to and from the primary pulley cylinder chamber 11c in accordance with a displacement of a spool 32a, thereby regulating the primary pressure such that a target shift ratio indicated by a drive position of the step motor 40 is achieved, and when a shift is actually completed, the shift control valve 32 receives a displacement from the servo link 50 to hold the spool 32a in a closed position.

The pressure reducing valve 33 is a control valve that includes a solenoid and controls a pressure (to be referred to hereafter as a "secondary pressure") supplied to the secondary pulley cylinder chamber 12c to a desired target pressure.

The shift ratio of the primary pulley 11 and secondary pulley 12 is controlled by the step motor 40, which is driven in accordance with a shift command signal from the CVTCU 20, and the spool 32a of the shift control valve 32 is driven in accordance with the displacement of the servo link 50, which operates in response to the step motor 40. Thus, the line pressure supplied to the shift control valve 32 is regulated such that the primary pressure is supplied to the primary pulley 11, and as a result, the groove width is controlled variably and set at a predetermined shift ratio.

The CVTCU 20 reads a range signal from the inhibitor switch 23, an accelerator pedal stroke from the accelerator pedal stroke sensor 24, an oil temperature of the belt type continuously variable transmission 10 from the oil temperature sensor 25, signals from the primary pulley speed sensor 26, the secondary pulley speed sensor 27, an oil pressure sensor 29, and so on in order to control the shift ratio and the contact frictional force of the V belt 13 variably. The oil pressure sensor 29 detects the secondary pressure applied to the cylinder chamber 12c of the secondary pulley.

A target value of the line pressure is determined from the input torque information, the speed ratio, and the oil temperature, whereupon the line pressure is controlled by driving the solenoid of the regulator valve 31. Further, a target value of the secondary pressure is determined, whereupon the solenoid of the pressure reducing valve 33 is driven in accordance with a detection value of the oil pressure sensor 29 and the target value, and thus the secondary pressure is controlled by feedback control.

Figure 3:
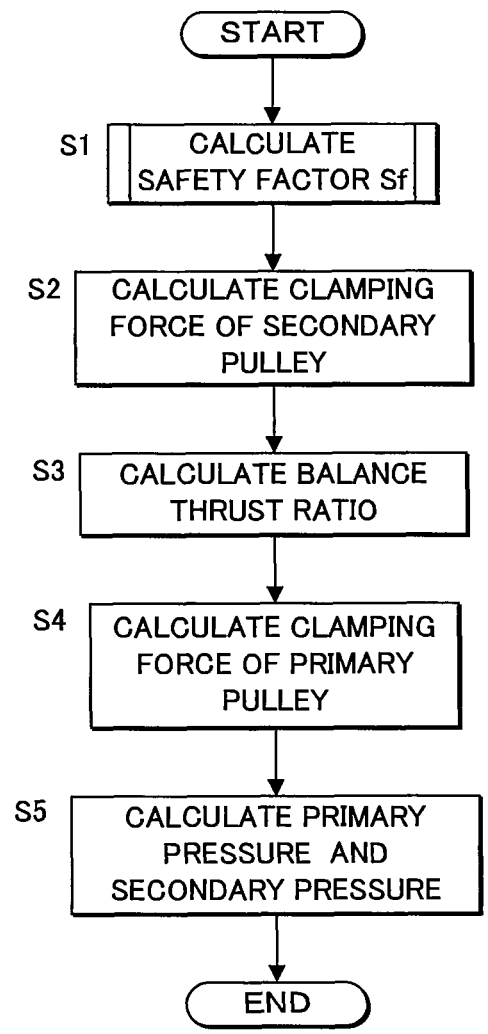
FIG. 3 is a flowchart showing control of the belt type continuously variable transmission according to this embodiment.

Control performed by the CVTCU 20 to calculate the primary pressure and the secondary pressure will now be described with reference to FIG. 3. FIG. 3 is a flowchart showing control for calculating the primary pressure and secondary pressure, which is executed repeatedly at predetermined short time intervals (of 10 ms, for example).

In a step S1, a safety factor Sf is calculated. The safety factor Sf is a value used when calculating a clamping force Fzs of the secondary pulley 12, and is set as a margin of the clamping force Fzs of the secondary pulley 12. A method of calculating the safety factor Sf will be described below.

In a step S2, the clamping force Fzs of the secondary pulley 12 is calculated on the basis of the safety factor Sf set in the step S1. The clamping force Fzs of the secondary pulley 12 is calculated on the basis of a following Equation (1).

$$F_{ZS} = \frac{T_{in}\cos\theta}{2R_{p\mu}}Sf \qquad \text{Equation (1)}$$

Here, Tin is the torque input into the primary pulley 11, θ is a semi-vertex angle (sheave angle) of the pulleys 11, 12, Rp is a belt winding radius of the primary pulley 11, and μ is a frictional coefficient between the belt 13 and the pulleys 11, 12. The belt winding radius Rp of the primary pulley 11 is calculated on the basis of a pulley ratio Ip, a belt circumference, and an inter-axial distance between the pulleys, the latter two taking fixed values.

Figure 4:
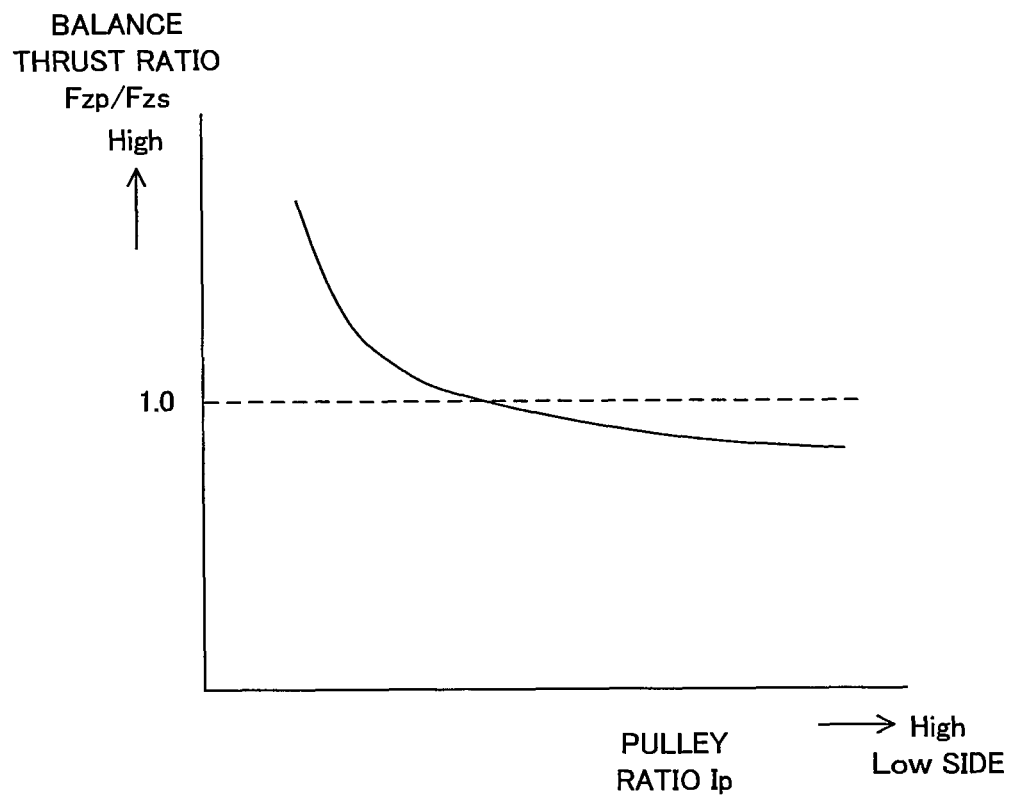
FIG. 4 is a map showing a relationship between a pulley ratio and a balance thrust ratio.

In a step S3, a balance thrust ratio Fzp/Fzs is calculated. The balance thrust ratio Fzp/Fzs is a ratio of a clamping force Fzp of the primary pulley 11 to the clamping force Fzs of the secondary pulley 12, which is calculated on the basis of a map shown in FIG. 4 as a value required to maintain the pulley ratio Ip in a state of equilibrium. FIG. 4 is a map showing a relationship between the pulley ratio Ip and the balance thrust ratio Fzp/Fzs, on which the balance thrust ratio Fzp/Fzs is set steadily lower as the pulley ratio Ip increases and set lower than 1.0 on a Low side.

In a step S4, the primary clamping force Fzp is calculated. The primary clamping force Fzp is calculated by multiplying the balance thrust ratio Fzp/Fzs by the secondary clamping force Fzs. Further, during an upshift, the primary clamping force Fzp is calculated by further adding thereto a differential thrust set on the basis of a target shift speed. The differential thrust is a force for achieving the target shift ratio.

In a step S5, the primary pressure and secondary pressure are calculated on the basis of the primary clamping force Fzp and secondary clamping force Fzs.

Figure 5:
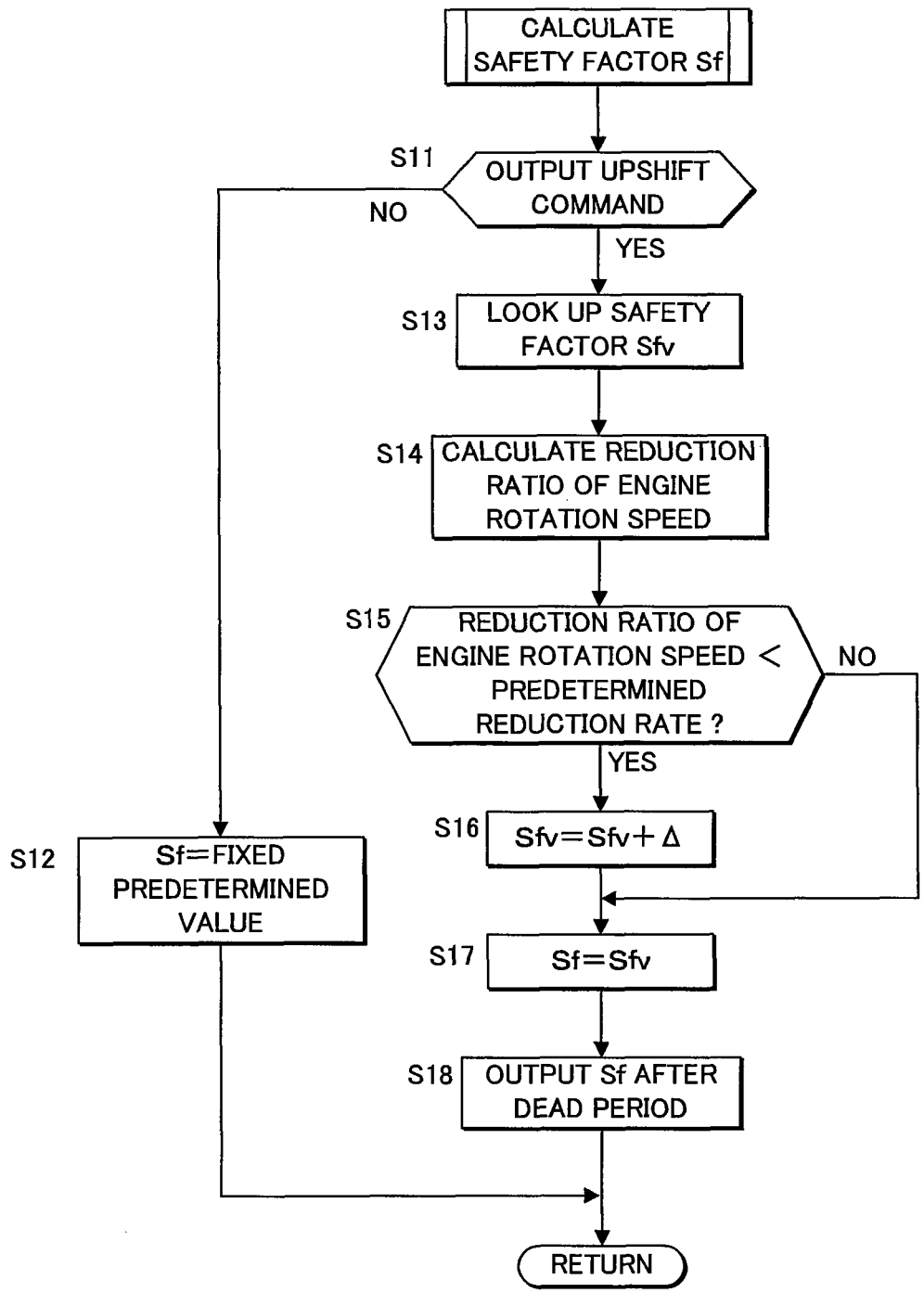
FIG. 5 is a flowchart showing control of the belt type continuously variable transmission according to this embodiment.

Calculation of the safety factor Sf in the step S1 will now be described with reference to FIG. 5. FIG. 5 is a flowchart showing control for calculating the safety factor Sf, which is executed repeatedly at predetermined short time intervals (of 10 ms, for example).

In a step S11, a determination is made as to whether or not an upshift command has been output. When it is determined that an upshift command has been output, the routine advances to a step S13, and when it is determined that an upshift command has not been output, the routine advances to a step S12. Here, an upshift command is output when a target pulley ratio is lower than the current pulley ratio Ip, and is output continuously until a series of shift operations is complete.

In the step S12, the safety factor Sf is set at a fixed predetermined value, whereupon the processing is terminated.

Figure 6:
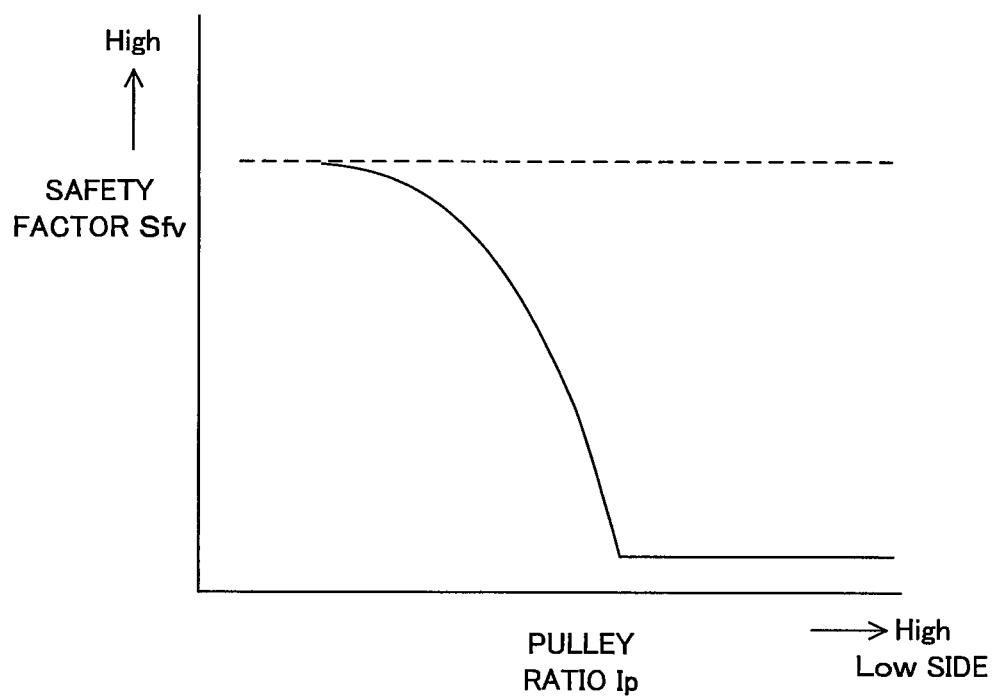
FIG. 6 is a map showing a relationship between the pulley ratio and a safety factor.

In the step S13, a safety factor Sfv is looked up on a map shown in FIG. 6. FIG. 6 is a map showing a relationship between the pulley ratio Ip and the safety factor Sfv, on which a broken line indicates the conventional (fixed value) safety factor Sf. As shown in FIG. 6, the safety factor Sfv is set to be lower as the pulley ratio Ip increases and to remain constant at or above a predetermined pulley ratio Ip. The predetermined pulley ratio Ip is set at the pulley ratio Ip when the balance thrust ratio Fzp/Fzs is 0.9, for example.

In a step S14, a reduction ratio of an engine rotation speed is calculated. The reduction rate of the engine rotation speed is calculated by comparing the current engine rotation speed with the engine rotation speed during the previous control, for example. During an upshift, the pulley ratio Ip decreases, and therefore the engine rotation speed decreases such that the reduction rate of the engine rotation speed takes a positive value.

In a step S15, a determination is made as to whether or not the reduction rate of the engine rotation speed is smaller than a predetermined reduction rate. When the reduction rate of the engine rotation speed is smaller than the predetermined reduction rate, the routine advances to a step S16, and when the reduction rate is equal to or larger than the predetermined reduction rate, the routine advances to a step S17. During an upshift, the engine rotation speed decreases as the pulley ratio Ip decreases, but when the safety factor Sf is too low, the secondary pressure becomes insufficient, and therefore the engine rotation speed tends to race, causing the reduction rate to decrease. Hence, the predetermined reduction rate is set at a value at which the possibility of slippage of the belt 13 caused by insufficient secondary pressure can be determined, this value being determined in advance through experiment or the like.

In the step S16, a small value Δ is added to the safety factor Sfv to obtain a new safety factor Sfv.

In the step S17, the safety factor Sfv set in the steps S13 to S16 is set as the safety factor Sf.

In a step S18, the safety factor Sf is output after a dead period, whereupon the processing is terminated. A delay occurs between output of the upshift command and modification of the actual pulley ratio Ip, and therefore this delay is determined in advance as a dead period through experiment or the like, and the safety factor Sf is output following the elapse of the dead period. In other words, the safety factor Sf set in the step S12 continues to be output until the dead period has elapsed, even after the upshift command is output.

In the control described above, the safety factor Sf during an upshift is set at a lower value than the safety factor Sf when the pulley ratio Ip is in a steady state, and as a result, the secondary clamping force Fzs and the primary clamping force Fzp obtained by adding the differential thrust to the secondary clamping force Fzs are controlled to lower values than the values thereof in a steady state. Reduction of the safety factor Sf during an upshift will now be described in further detail.

When Equation (1) for calculating the secondary clamping force Fzs is subjected to time differentiation, a following Equation (2) is obtained.

$$\frac{\partial F_{ZS}}{\partial t} = \frac{T_{in} \cos\theta Sf}{2\mu} \cdot \frac{-1}{R_p^2} \frac{\partial R_p}{\partial t} \qquad \text{Equation (2)}$$

It can be seen from Equation (2) that the secondary clamping force Fzs is a decreasing function relating to the belt winding radius Rp of the primary pulley 11. More specifically, during an upshift, in which the belt winding radius Rp of the primary pulley 11 increases, the secondary clamping force Fzs decreases. Hence, during an upshift, the safety factor Sf can be set at a lower value than the value thereof in a steady state.

Particularly during a Low period in which the pulley ratio Ip is high, the balance thrust ratio Fzp/Fzs is small and the secondary clamping force is greater than the primary clamping force. Furthermore, during a Low period, a belt winding radius Rs of the secondary pulley 12 is larger than the belt winding radius Rp of the primary pulley 11. Hence, if belt slippage occurs during a Low period, the belt slippage occurs on the primary pulley side.

Therefore, the safety factor Sf during an upshift can be set at a lower value than the safety factor Sf in a steady state, and moreover, the safety factor Sf can be set at a steadily lower value as the pulley ratio Ip shifts toward the Low side.

Figure 7:
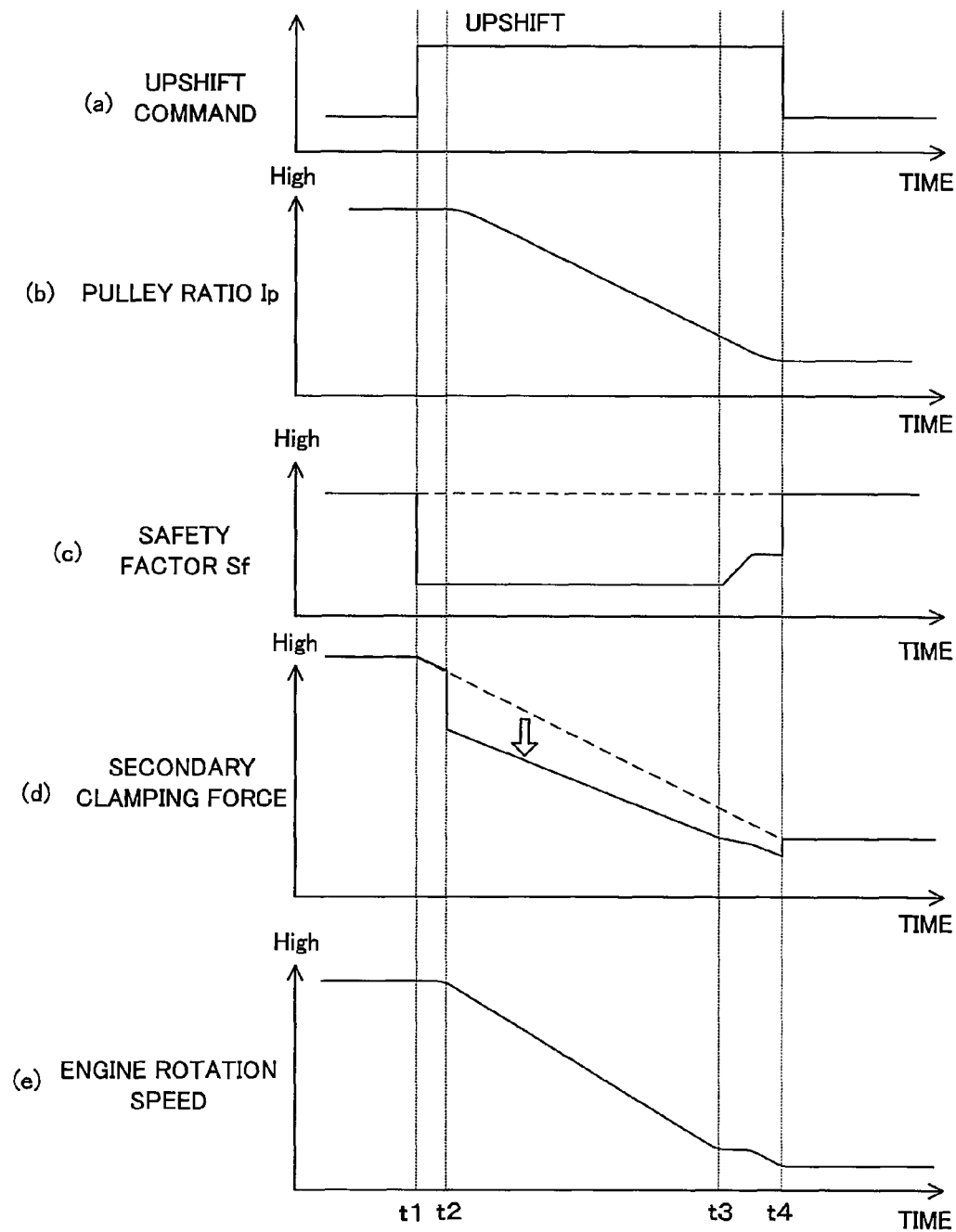
FIG. 7 is a time chart showing actions of the belt type continuously variable transmission according to this embodiment.

Next, actions of this embodiment will be described using FIG. 7. FIG. 7 is a time chart illustrating actions of the belt type continuously variable transmission according to this embodiment. In FIG. 7, (a) shows the upshift command, (b) shows the pulley ratio Ip, (c) shows the safety factor Sf, (d) shows the secondary clamping force, and (e) shows the engine rotation speed. Broken lines in (c) and (d) indicate variation in the conventional example.

As a vehicle travels, the upshift command is output at a time t1, whereupon the safety factor Sf is set at a lower value than the value thereof in a steady state by referring to the map. Once the dead period has elapsed, the safety factor Sf is output at a time t2, whereupon the secondary clamping force is calculated on the basis of the safety factor Sf. As a result, the secondary clamping force takes a lower value than that of the conventional example indicated by the broken line.

As the pulley ratio Ip decreases, the engine rotation speed also decreases, and at a time t3, the secondary clamping force becomes insufficient such that the reduction rate of the engine rotation speed is determined to be lower than the predetermined reduction rate. Therefore, the small value Δ is added to the safety factor Sf until the reduction rate of the engine rotation speed rises to or above the predetermined reduction rate. As a result, the secondary clamping force rises, thereby preventing slippage of the belt 13.

When the upshift is completed at a time t4, the safety factor Sf is returned to the pre-shift fixed predetermined value.

In the embodiment described above, when it is determined that an upshift command has been output, the safety factor Sf is looked up on the map and set at a lower value than the value thereof in a steady state, and therefore, during an upshift, when it is possible to reduce the pulley clamping force required to hold the belt, the pulley clamping force can be set at a lower value, thereby reducing the pulley thrust within a range in which belt slippage does not occur. Hence, during an upshift, the secondary pressure and the differential thrust-adjusted primary pressure decrease, and as a result, the line pressure can be reduced, enabling a reduction in the load of the hydraulic pump 34 and an improvement in fuel efficiency.

Furthermore, the secondary clamping force is set at a lower value during an upshift such that a thrust difference is generated between the secondary clamping force and the primary clamping force, and therefore an improvement in shift responsiveness can be achieved during an upshift. More specifically, during an upshift, the target shift speed is achieved by adding the differential thrust to the primary clamping force, and since the secondary clamping force is set at a lower value, a thrust difference can be generated easily, enabling a corresponding improvement in shift responsiveness.

Further, the safety factor Sf is set steadily lower as the pulley ratio Ip upon output of the upshift command increases (i.e. shifts further toward the Low side). Here, as the pulley ratio Ip increases, the balance thrust ratio Fzp/Fzs decreases and the belt winding radius of the secondary pulley 12 increases, and therefore belt slippage becomes less likely to occur in the secondary pulley 12. Therefore, as belt slippage becomes steadily less likely to occur in the secondary pulley 12, the safety factor Sf can be set lower and the secondary pressure can be reduced further, and as a result, a further improvement in fuel efficiency can be achieved while preventing belt slippage. During an upshift performed immediately after start-up from a Lowest condition, in which the pulley ratio Ip is at a maximum, the safety factor Sf can be set at a minimum value, enabling a further improvement in fuel efficiency.

Furthermore, when an upshift command is output such that the safety factor Sf is set at a lower value, the safety factor Sf is output after the dead period, and therefore the delay in the actual shift operation relative to the shift command can be taken into account and the secondary pressure is reduced in accordance with the delay. As a result, an improvement in fuel efficiency can be achieved while preventing belt slippage due to insufficient secondary pressure.

Moreover, when the reduction rate of the engine rotation speed is determined to be lower than the predetermined reduction rate during an upshift, the safety factor Sf is increased, and therefore, in cases where the safety factor Sf is reduced excessively, the secondary pressure can be corrected to a higher side by detecting a racing tendency in the engine 1. As a result, belt slippage can be prevented even more reliably.

This invention is not limited to the embodiment described above, and may be subjected to various alterations and modifications within the scope of the technical spirit thereof.

This application claims priority from Japanese Patent Application 2009-71402, filed Mar. 24, 2009, which is incorporated herein by reference in its entirety.

What is claimed is:

1. A belt type continuously variable transmission comprising:
　a continuously variable shift mechanism having a primary pulley and a secondary pulley, respective pulley widths of which can be modified, and a belt wound around the respective pulleys, which varies a shift ratio by varying the pulley width in order to vary a contact radius between the respective pulleys and the belt;
　a pulley thrust calculation unit that calculates a pulley thrust, which is used to bias the respective pulleys in a direction for reducing the pulley width, so as to include a predetermined margin;
　a hydraulic control unit that controls an oil pressure supplied to each of the pulleys on the basis of the calculated pulley thrust; and
　an upshift determination unit that determines whether or not an upshift, during which the speed ratio is reduced, is underway,
　wherein the pulley thrust calculation unit sets the predetermined margin to be smaller when an upshift is determined to be underway than when an upshift is determined not to be underway.

2. The belt type continuously variable transmission as defined in claim 1, wherein the pulley thrust calculation unit increases an amount by which the predetermined margin is reduced steadily as the shift ratio following determination of an upshift increases.

3. The belt type continuously variable transmission as defined in claim 1, wherein the pulley thrust calculation unit reduces the predetermined margin after a predetermined time delay has elapsed following determination of an upshift.

4. The belt type continuously variable transmission as defined in claim 1, wherein a torque from an engine is input into the primary pulley,
　a reduction rate determination unit is provided to determine whether or not a reduction rate of a rotation speed of the engine is lower than a predetermined reduction rate, and
　when the reduction rate of the rotation speed of the engine is determined to be lower than the predetermined reduction rate, the pulley thrust calculation unit sets the predetermined margin to be larger than a current margin.

5. A control method for a belt type continuously variable transmission which includes a continuously variable shift mechanism having a primary pulley and a secondary pulley, respective pulley widths of which can be modified, and a belt wound around the respective pulleys, which varies a shift ratio by varying the pulley width in order to vary a contact radius between the respective pulleys and the belt, comprising:
　calculating a pulley thrust which is used to bias the respective pulleys in a direction for reducing the pulley width so as to include a predetermined margin;

controlling an oil pressure supplied to each of the pulleys on the basis of the calculated pulley thrust; and determining whether or not an upshift, during which the speed ratio is reduced, is underway, wherein the predetermined margin is set to be smaller when an upshift is determined to be underway than when an upshift is determined not to be underway.

6. The control method for the belt type continuously variable transmission as defined in claim 5, wherein an amount by which the predetermined margin is reduced steadily increases as the shift ratio following determination of an upshift increases.

7. The control method for the belt type continuously variable transmission as defined in claim 5, wherein the predetermined margin reduces after a predetermined time delay has elapsed following determination of an upshift.

8. The control method for the belt type continuously variable transmission as defined in claim 5, wherein determining whether or not a reduction rate of a rotation speed of a engine is lower than a predetermined reduction rate, and when the reduction rate of the rotation speed of the engine is determined to be lower than the predetermined reduction rate, the predetermined margin is set to be larger than a current margin.

9. A belt type continuously variable transmission comprising:

a continuously variable shift mechanism having a primary pulley and a secondary pulley, respective pulley widths of which can be modified, and a belt wound around the respective pulleys, which varies a shift ratio by varying the pulley width in order to vary a contact radius between the respective pulleys and the belt;

pulley thrust calculation means for calculating a pulley thrust, which is used to bias the respective pulleys in a direction for reducing the pulley width, so as to include a predetermined margin;

hydraulic control means for controlling an oil pressure supplied to each of the pulleys on the basis of the calculated pulley thrust; and upshift determination means for determining whether or not an upshift, during which the speed ratio is reduced, is underway, wherein the pulley thrust calculation means sets the predetermined margin to be smaller when an upshift is determined to be underway than when an upshift is determined not to be underway.

10. The belt type continuously variable transmission as defined in claim 9, wherein the pulley thrust calculation unit increases an amount by which the predetermined margin is reduced steadily as the shift ratio following determination of an upshift increases.

11. The belt type continuously variable transmission as defined in claim 9, wherein the pulley thrust calculation means reduces the predetermined margin after a predetermined time delay has elapsed following determination of an upshift.

12. The belt type continuously variable transmission as defined in claim 9, wherein a torque from an engine is input into the primary pulley, reduction rate determination means is provided to determine whether or not a reduction rate of a rotation speed of the engine is lower than a predetermined reduction rate, and when the reduction rate of the rotation speed of the engine is determined to be lower than the predetermined reduction rate, the pulley thrust calculation means sets the predetermined margin to be larger than a current margin.

* * * * *